Jan. 7, 1969    J. BAUDE    3,421,028
STATIC PROTECTIVE RELAY SYSTEM
Filed Nov. 24, 1959

Inventor
John Baude
By Warren F. B. Lindsley
Attorney

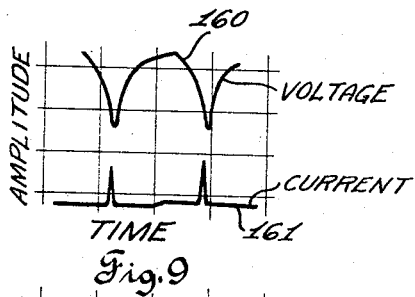
Fig. 9
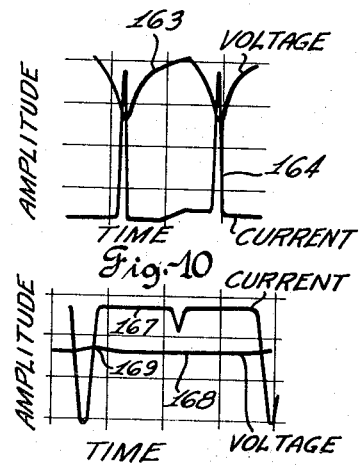
Fig. 10
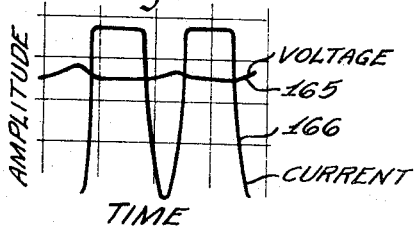
Fig. 11
Fig. 12
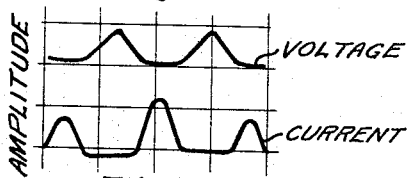
Fig. 14
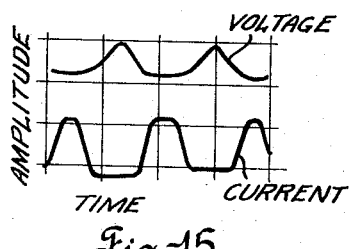
Fig. 15
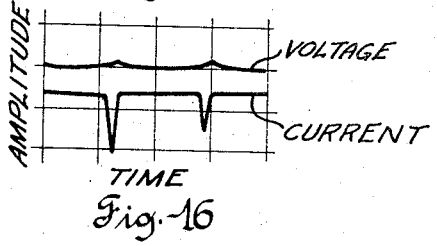
Fig. 16
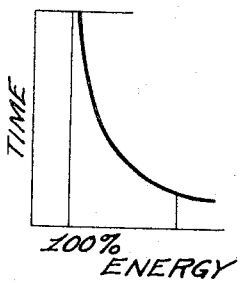
Fig. 17
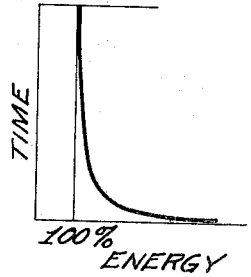
Fig. 18

United States Patent Office 3,421,028
Patented Jan. 7, 1969

3,421,028
STATIC PROTECTIVE RELAY SYSTEM
John Baude, Milwaukee, Wis., assignor to Allis-Chalmers Manufacturing Company, Milwaukee, Wis.
Filed Nov. 24, 1959, Ser. No. 855,214
U.S. Cl. 307—293                                23 Claims
Int. Cl. H03k 17/26; 17/28

This invention relates to protective relay systems and more patricularly to a new system of protective relaying based upon the use of a plurality of electrical quantities integrated to form a registrating and regulating function.

For practically half a century induction disk type relays and relays of similar construction have provided the power engineer with the only reliable and relatively flexible tool for power line and distribution network protection. The rapidly growing semiconductor industry provides us today with equally powerful tools which when properly applied greatly improves the basic art of protective relaying.

In the new system disclosed and claimed static circuits are used throughout making possible the use of miniaturized components of high reliability which are not affected by vibration or mechanical shock or other adverse environmental conditions. In the claimed invention all sensing and time relay functions are performed at a low power level by static circuits. The control functions for effecting operation of, for example, a circuit breaker are performed by static bistable circuits or flip-flops at low power levels with the final output signals being amplified to a sufficiently high level to effect operation of the final control devices. A system is provided which operates almost entirely at a low power level, so that there is little heat to be dissipated and small, rugged, static components are utilized so that the system can be made small and compact. This new system is highly reliable since it does not depend on accurate calibration of devices involving moving parts and is compensated for temperature variations normally encountered in locations where protective relays are installed.

In accordance with the invention claimed a new and improved protective relay system is provided for controlling a power source comprising a static relay storage device for receiving electrical quantities from a power source and to emit a second electrical quantity. A sensing circuit or device is employed for passing to the storage device electrical quantities from a power source in the form of a continuous current flow or only voltage or current pulses of predetermined magnitude and duration. The storage device is charged at a rate depending upon the electrical volt-second quantity passed by the sensing device.

It is, therefore, one object of this invention to provide a new and improved relay system.

Another object of this invention is to provide a new and improved static relay system utilizing the registration and/or regulation of electrical quantities for controlling the operation of a plurality of electrical devices.

A further object of this invention is to provide a new and improved relay system in which a plurality of pulses of different electrical quantities are fed into static devices to provide a resultant force which controls an electrical device.

Objects and advantages other than those set forth will be apparent from the following description when read in connection with the accompanying drawing, in which.

Figure 1:
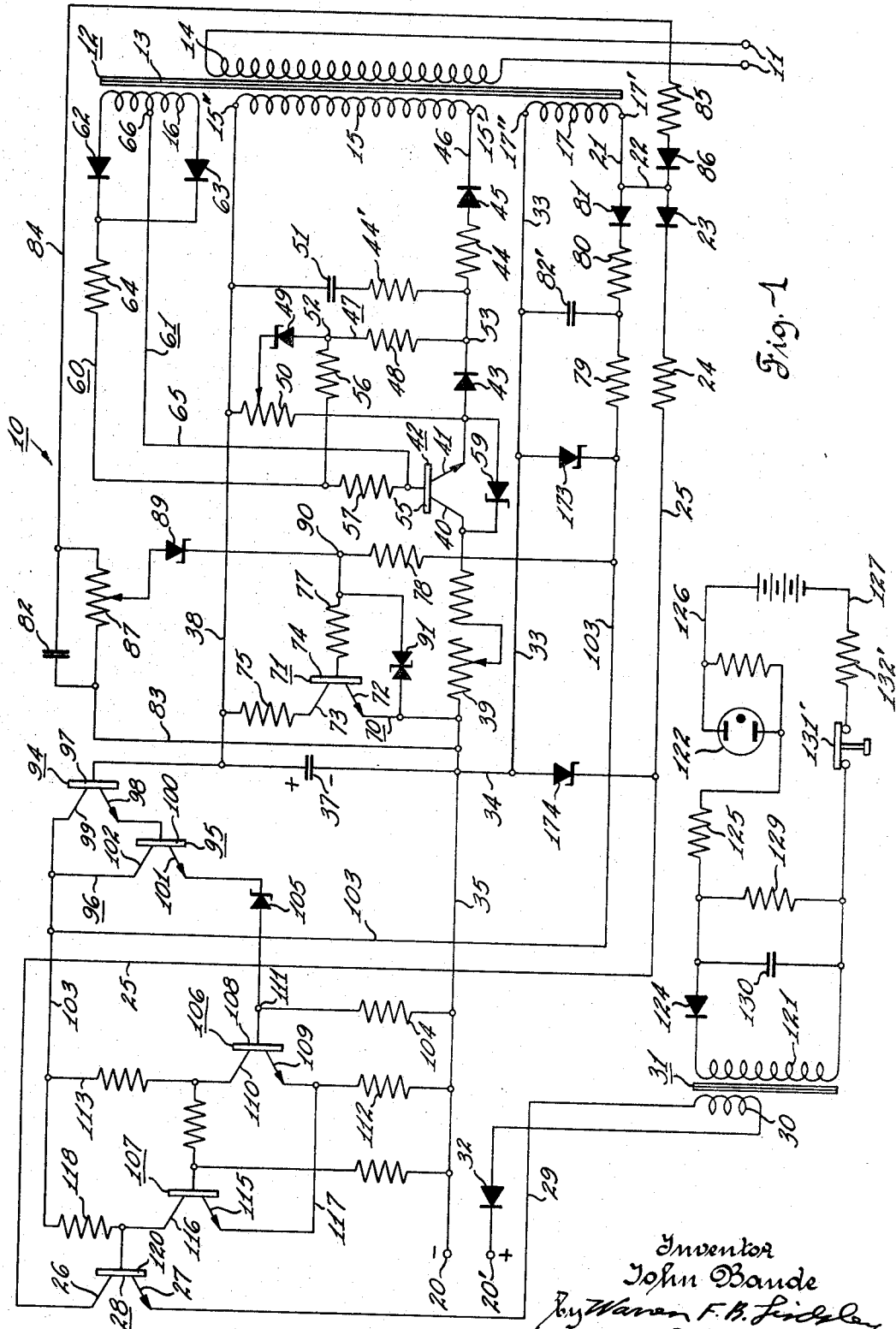
FIG. 1 is a diagrammatic view of an improved protective relay system embodying the invention.
Figure 4:
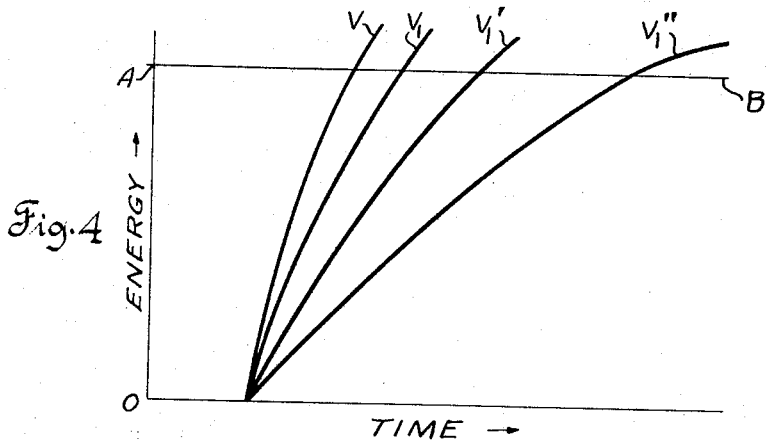
FIG. 4 illustrates graphically the time-charge characteristics of the build-up of the energy in the storage device.
Figure 5:
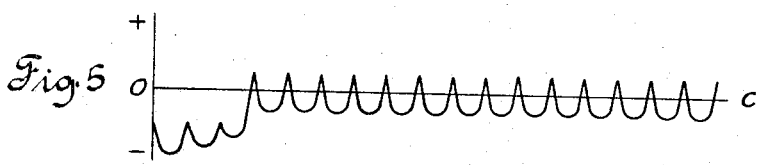
FIG. 5 is an example of the discrete electrical control signal characteristics by virtue of which electrical energy is built-up in accordance with curve $V_1''$ in FIG. 4.
Figure 7:
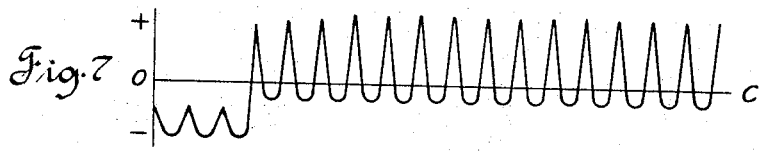
FIG. 7 is an example of the discrete electrical control signal characteristics by virtue of which electrical energy is built-up in accordance with curve $V_1'$ in FIG. 4.
Figure 13:
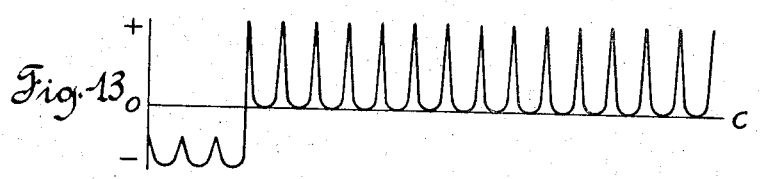
Figure 19:
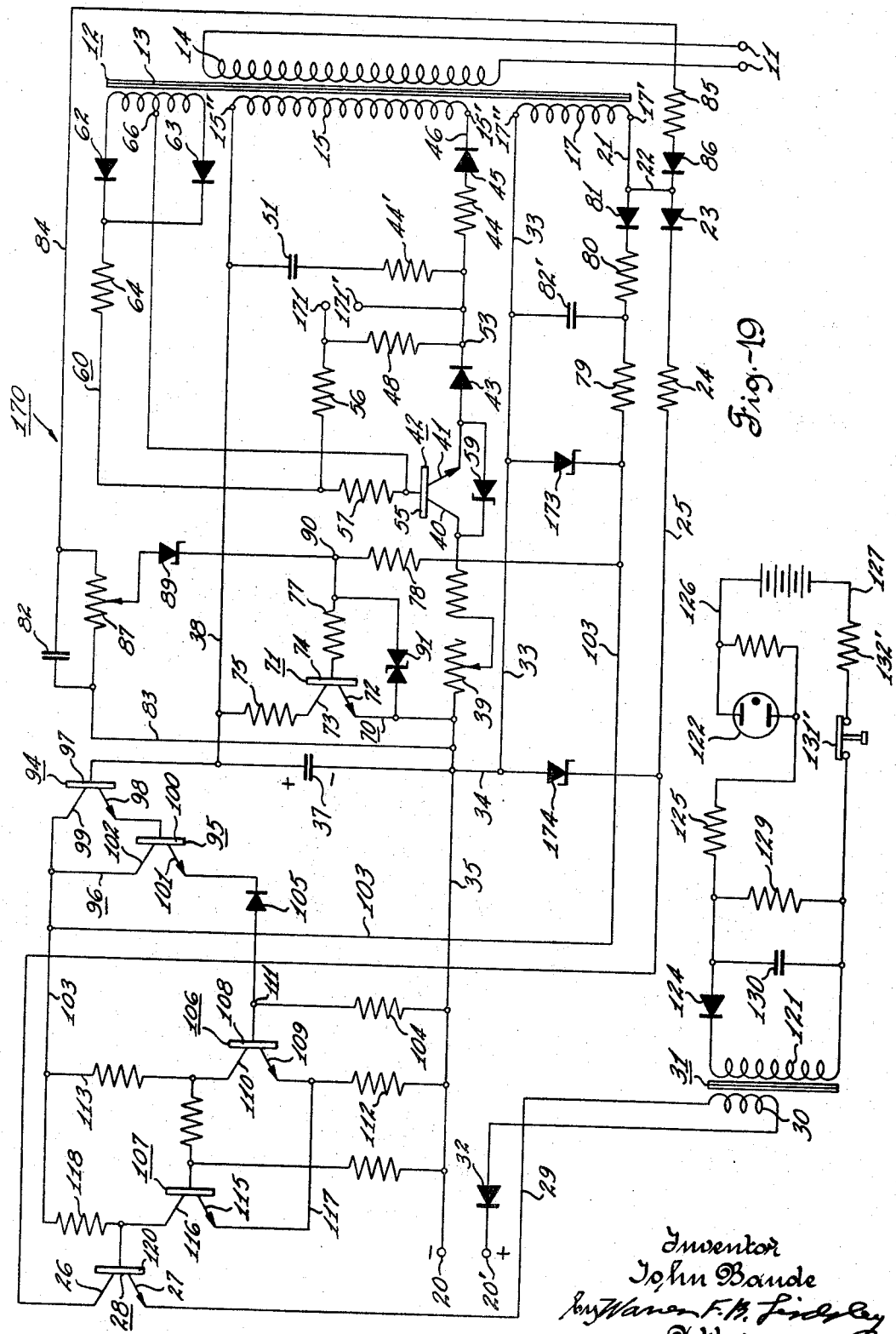

FIG. 9 illustrates in the upper tracing an oscillograph record of the discrete electrical control signal shown in FIG. 5 as applied to the control elements of a static switch. In the lower tracing an oscillograph record is shown illustrating current pulses similar to FIG. 6 which are passed by the static switch, resulting in a build-up of energy in the storage device in accordance with $V_1''$ of FIG. 4;

FIG. 10 illustrates in the upper tracing an oscillograph record of the discrete electrical control signal shown in FIG. 7 as applied to the control elements of a static switch. In the lower tracing in the oscillograph record is shown, current pulses similar to FIG. 8 which are passed by a static switch, resulting from a build-up of energy in the storage device in accordance with $V_1'$ of FIG. 4;

FIG. 11 illustrates in the upper tracing an oscillograph record of a control voltage applied across the control elements of a static switch and in the lower trace an oscillograph record of the current pulses passed by this static switch which results in a build-up of energy in the storage device in accordance with $V_1$ of FIG. 4;

FIG. 12 illustrates in the upper tracing an oscillograph record of a control voltage applied across the control elements of a static switch and in the lower trace an oscillograph record of the current pulses passed by this static switch which results in a build-up of energy in the storage device approximately in accordance with V of FIG. 4;

FIG. 13 is an example of the discrete electrical control signal characteristics by virtue of which electrical energy is continuously built up in accordance with curve V in FIG. 4;

FIGS. 14, 15 and 16 illustrate oscillograph records similar to those shown in FIGS. 9, 10, 11 and 12 of the control voltage applied to the control elements of a static switch and the energy pulses passed by the switch when the shape of the control signal follows the shown pattern;

FIGS. 17 and 18 illustrate the time-energy storage performance for two discretely different control signal patterns, identified by reference to FIGS. 9 and 15; and FIG. 19 is a modification of the circuit shown in FIG. 1.

It will be apparent that the basic principles of the invention can be applied in various ways to perform the sensing and control functions required for different installations. However, in order to illustrate the invention, a few typical embodiments have been shown in the drawings applied to the control and protection of a power source through the operation of a circut breaker (not shown).

Referring more particularly to the drawings wherein like parts are designated by like characters of reference throughout the figures, FIG. 1 illustrates a protective relay system 10 which is utilized for sensing a variable electrical condition in a power source 11. Relay system 10 controls power source 11 through a transformer 12 which is electrically associated therewith. Transformer 12 comprises a core 13, at least one input or primary winding 14 directly connected across the power source 11 and a plurality of secondary windings for example windings 15, 16 and 17. If the power source 11 transmits, for example, a series of electrical pulses then the secondary windings associated with transformer 12 will transmit to the relay system 10 a plurality of signal pulses, the duration, amplitude and frequency of which depend upon the saturation condition of core 13 and these same conditions among other things of the primary power source.

Secondary windings 15, 16 and 17 of transformer 12 are connected to inverse time-voltage or inverse time-current circuits of the relay and employ transistor controlled pulse responsive electrical circuit elements with integrating inverse time-voltage or current characteristics. In order to make the unit suitable for protective relaying purposes, the characteristics of the relay must be extremely flexible. Its accuracy must be unaffected by temperatures normally encountered and excessive overload currents due to short circuits in the power circuit 11, and resulting voltage surges must be absorbed in such a manner that no damage results to the relay.

As shown in FIG. 1 a system is provided for the control and production of a signal applied to the output terminals 20, 20'. This applied signal to terminals 20, 20' is the output signal of secondary winding 17 of transformer 12 fed from terminal 17' of winding 17 through conductor 21, conductor 22, diode 23, resistor 24, conductor 25, collector 26 and emitter 27 of the normally nonconductive transistor 28, conductor 29, primary winding 30 of transformer 31, diode 32 to terminal 20', and from terminal 17" of winding 17 through conductors 33, 34 and 35 to terminal 20.

Transistor 28 controlling the applied signal pulse to terminals 20, 20' is in turn controlled by the integrated effects of the electrical energy such as, for example, pulses received from secondary windings 15, 16 and 17 of transformer 12.

The output signals of secondary windings 15, 16 and 17 are used to control the energization of transistor 28. Electrical energy emitted by winding 15 charges capacitor 51 and above a certain predetermined energy level also capacitor 37. Capacitor 37 may be directly connected to terminal 15" of secondary winding 15 through a conductor 38 and to terminal 15' of secondary winding 15 through an adjustable resistor 39.

The circuit in this form, namely where capacitor 37 is directly connected to winding 15 through conductor 38 and adjustable resistor 39, has a fixed time constant which is independent of the electrical condition of the source. The time constant can be varied depending upon the selected resistance values of the adjustable resistor 39 and capacitors 51 and 37. For certain types of relatively high speed relays such circuits will furnish the desired results. For most cases a variable time constant is required. This means that in order to have control over the inverse time-current characteristics of the relay, the time constant of the circuit must be a function of the energy level of the source connected to the primary winding 14 of transformer 12, and/or in addition to this must be a function of a predetermined single or multiple relay control requirement. In order to provide such flexibility at least one semiconductor switch such as, for example, a transistor 42 and control circuits are connected in series with resistor 39 in the manner shown in FIG. 1. It will become apparent that additional transistors connected in series with each other can be used to perform multiple control functions based upon receipt of a plurality of separate signals. It is also conceivable that such additional transistors may be connected in parallel with each other in which case each transistor controls independently from the other the rate at which the electrical charge is transferred to capacitor 37.

In the following description of FIG. 1 only one normally nonconducting semiconductor such as transistor 42 comprising a collector 40 and a base 55 is used. Collector 40 and emitter 41 are connected in series with a diode 43, resistor 44, diode 45, and conductor 46 to terminal 15' of winding 15 and through resistor 39 to one side of capacitor 37. Upon capacitor 37 receiving a predetermined electrical charge a complex mono-bistable electrical or electro-mechanical or electro-magnetic or electro-chemical device is triggered into a state of conduction which renders transistor 28 conductive to pass energy such as pulses from secondary winding 17 of transformer 12 to terminals 20, 20'. The absorbed energy in capacitor 37 merely provides the required inverse time energy functions before triggering action is accomplished.

Transistor 42 is normally biased to cut off, but is rendered conductive upon the pulses transmitted from secondary winding 15 reaching a predetermined level. The predetermined level is established as the full load operating point of the relay. Transformer 12 transmits electrical energy up to a predetermined level without charging capacitor 37 because transistor 42 is retained biased in its nonconductive state. In order to determine the point of conduction of transistor 42 a shunting or sensing device or circut 47 is arranged across the secondary winding 15 of transformer 12 and comprises a resistor 48, a Zener diode 49 and a potentiometer 50. Shunting capacitor 51 is shown across secondary winding 15 and in series with resistor 44, and diode 45 for stabilizing purposes. Capacitor 51 is optional and may be eliminated for ultrafast operating relays or may be connected in series with a suitable resistor 44', as shown. Diode 45 and resistor 44 connected in series with secondary winding 15, as shown in FIG. 1, charge capacitor 51 on each electrical pulse of proper polarity applied to primary winding 14 of transformer 12. Zener diode 49 starts to breakdown at the instant the voltage across it reaches a predetermined value at which time it starts to pass current. When Zener diode 49 passes current, a voltage will appear across resistors 48 which renders point 52 in circuit 47 positive with respect to point 53.

Point 52 is interconnected with a base 55 of transistor 42 through resistors 56 and 57. Making point 52 positive with respect to a point 53 puts or impresses a positive potential on base 55 of transistor 42 and renders it conductive. When Zener diode 49 is nonconductive, only transistor leakage current flows through circuit 47 and the base 55 of transistor 42 is biased negative with respect to emitter 41 rendering transistor 42 nonconductive. In the nonconductive state of Zener diode 49 only the voltage drop of approximately .6 volt appears across diode 43. When Zener diode 49 conducts current, transistor 42 is rendered conductive and passes current through its emitter collector circuit to capacitor 37. The potential applied to base 55 of transistor 42 upon the conduction of Zener diode 49 is known as bias. This bias is a differential potential between the potential drop built up across resistor 48 upon the conduction of Zener diode 49 and the .6 volt drop across the diode 43. In order to limit the possible voltage drop across transistor 42 at cutoff to a predetermined value a Zener diode 59 is applied in shunting arrangement across its emitter and collector elements.

In order to provide additional means for controlling the transfer of energy by means of transistor 42, voltages of varying polarity, phase angle and frequency may be applied to points 55 and 58 and across resistor 57 either continually or periodically for aiding or restraining the effect of the DC bias as provided by action of Zener diode 49. Zener diode 49 may also be replaced by a suitable passive or active circuit element, such as an external switch, or a second DC or AC power source. In this manner a plurality of functions can be integrated by action of capacitor 37 in any desired mode or fashion.

In order to restrict the amount of energy transferred to capacitor 37 a restraining signal in addition to the DC bias is applied to base 55 of transistor 42 from secondary winding 16 of transformer 12 through circuits 60 and 61. Circuit 60 comprises a pair of diodes 62 and 63 connected at one point to each other and each to different terminal ends of secondary winding 16 and at said one point further connected in series with a pair of serially connected fixed or variable resistors 64 and 57. Circuit 61 comprises a conductor 65 connected at one end to the base 55 of transistor 42 and at the other end to the center tap 66 of secondary winding 16 of transformer 12. The voltage pulses from winding 16 are applied across resistor 57 and in combination with the signal from Zener diode 49 render transistor 42 periodically conductive. By rendering transistor 42 conductive causes the emitter collector circuit of transistor 42 to conduct current. The restraining signal from winding 16 of transformer 12 renders transistor 42 conductive for only a part of a cycle so that the time duration of current conduction, for example, the width and amplitude of the curent cycle passed by transistor 42 may be controlled. By varying the position of potentiometer 50 and resistance of resistor 64 the inverse time current characteristics of the relay may be varied. The resultant voltage V applied to base 55 of transistor 42 may be expressed by the following equation:

$$Vz-Vd-Vac=Vt$$

wherein $Vz$ is the voltage drop caused by the Zener diode across resistor 48, $Vd$ is the .6 volt drop across diode 43, $Vac$ is the instantaneous voltage drop across resistor 57 from the signal source of winding 16 and $Vt$ is the resultant base to emitter control voltage on transistor 42.

As noted from FIG. 1 of the drawing the emitter and collector of transistor 42 are connected in series with the winding 15 of transformer 12, and when transistor 42 is biased for cutoff no charge is placed on capacitor 37. Because transistor 42 might pass a slight amount of current at high temperatures due to leakage current causing a charge to build up on capacitor 37 and eventually tripping the flip-flop circuits controlling transistor 28, another sensing circuit such as short circuit 70 is provided across capacitor 37. Short circuit 70 comprises a transistor 71 having an emitter 72, collector 73 and base 74. The emitter 72 and collector 73 are connected in series with a resistor 75 in shunt connection across capacitor 37, as shown. Transistor 71 is purposely kept conductive with the circuitry connected to its base 74 when transistor 42 is rendered nonconductive. Transistor 71 is rendered conductive upon a capacitor 82' being charged and by being connected to terminal 17' of winding 17 of transformer 12 through resistors 77, 78, 79, 80 and diode 81. Transistor 71 is rendered nonconductive upon a capacitor 82 being charged to a predetermined value. Capacitor 82 is connected through conductors 83, 34 and 33, to terminal 17" of secondary winding 17 of transformer 12 and through a conductor 84, resistor 85, diode 86 and conductors 22 and 21 to terminal 17' of secondary winding 17 of transformer 12.

A potentiometer 87 is connected in shunting arrangement across capacitor 82 with one terminal thereof connected through a Zener diode 89 to a point 90 between the series connection of resistors 77 and 78. When the potential across capacitor 82 reaches a predetermined value, Zener diode 89 breaks down and starts to conduct current. When Zener diode 89 starts to conduct, the potential on base 74 of transistor 71 is changed from positive to negative with respect to its emitter 72 and the transistor 71 ceases to pass current through its emitter collector circuit. When transistor 71 becomes nonconductive the shunt circuit across capacitor 37 comprising the emitter collector circuit of transistor 71 is interrupted. A charge then builds up across capacitor 37 upon the conduction of the emitter collector circuit of transistor 42. A double anode Zener diode 91 is connected in shunting arrangement across the emitter 72 and base 74 of transistor 71 and resistor 77 to protect the transistor against abnormally high voltage pulses which would destroy it.

As noted from the above, the controls of transistors 42 and 71 require coordination to start charging capacitor 37 when a predetermined voltage level has been reached by secondary winding 15. Thus, transistor 71 may be intermittently rendered nonconductive substantially simultaneously at the time transistor 42 is rendered conductive. When the voltage level of the electrical energy transmitted by secondary winding 15 is reduced to a predetermine value below the breakdown level of Zener diode 49, shunting circuit 47 is deenergized and no longer conducts current and the potential on base 55 of transistor 42 is made less positive or rendered negative causing transistor 42 to become nonconductive. When transistor 42 becomes nonconductive, transistor 71 is rendered conductive. Transistor 71 is intermittently rendered conductive by the voltage of the pulses from secondary winding 17 being reduced proportionally with the reduction of the voltage level of pulses from secondary winding 15 causing Zener diode 89 to be rendered nonconductive. The lack of current flow through Zener diode 89 causes the potential applied to base 74 of transistor 71 to become more positive and transistor 71 to become conductive. As soon as transistor 71 becomes conductive, capacitor 37 is discharged. Capacitor 37 may be charged and discharged practically instantaneously.

Although capacitor 37 is disclosed as the electric pulse accumulator or energy storage device for storing the time voltage characteristics of a series of pulses, i.e. charged at a rate depending on the volt second characteristics of the pulses passed by the sensing circuit 47, other types of storage devices may be used. For example, a square loop magnetic core may be used which is energized in steps until it is saturated and will pass current. An inductance or time relay device also may be used for a storage device. This invention is directed not merely to the use of a capacitor as a storage device, but among other things, to the method of charging the capacitor and its control by and with other static devices.

In order to increase the input impedance to the static flip-flop circuit controlling transistor switch 28 to refrain from unduly reducing the charge on capacitor 37, a pair of transistors 94 and 95 are used in a sensing circuit 96 provided for either continuously or sequentially checking the charge on this storage capacitor. In the structure shown in FIG. 1 the sensing circuit is continuously sampling the charge on capacitor 37. Transistor 94 comprises a base 97, emitter 98 and collector 99. Transistor 95 comprises a base 100, emitter 101 and collector 102. Base 97 of transistor 94 is connected to the positive terminal of capacitor 37 and the emitter 98 is connected to the base 100 of transistor 95. The collectors 99 and 102 of transistors 94 and 95, respectively, are connected through conductor 103, resistors 79 and 80, diode 81 and conductor 21 to terminal 17' of secondary winding 17 of transformer 12.

When capacitor 37 is charged to a predetermined voltage the positive charge is placed on base 97 of transistor 94. The emitter 98 of transistor 94 and the emitter 101 of transistor 95 assume essentially a potential slightly more positive than that of conductor 35 when capacitor 37 is in the state of discharge because of the leakage current flowing from wire 103 through collector 99 and emitter 98 of transistors 94 and collector 102 and emitter 101 of transistor 95, through Zener diode 105 and resistor 104 to conductor 35. The voltage which appears between conductors 35 and 103 is limited by Zener diode 173.

Transistors 94 and 95 are connected in a type of connection known as "compound-emitter-follower." The emitter potential will be slightly more negative than the base potentials of the respective transistors 94 and 95. Thus, if voltages rising on the capacitor 37 exceed the breakdown voltage of the Zener diode 105, emitters 101 and 98 are held at a potential determined by the voltage drop across resistor 104 and Zener diode 105. As the charge on the capacitor 37 continues to rise, bases 100 and 97 of transistors 95 and 94 will become more positive than the respective emitters 101 and 98 and current will now flow from terminal 17' of winding 17 through conductor 21, diode 81, resistor 80, resistor 79, conductor 103, collector 99 and emitter 98 and collector 102 and emitter 101 of transistors 95 and 94, respectively, and through Zener diode 105, resistor 104, conductors 35, 34 and 33 to terminal 17" of winding 17.

Under this operating condition base current of transistors 94 and 95 is flowing from terminal 15" of winding 15 through conductor 38, base 97 and emitter 98 of transistor 94, base 100 and emitter 101 of transistor 95, Zener diode 105, resistor 104, conductor 35, resistor 39, collector 40, emitter 41 of transistor 42, diode 43, resistor 44, diode 45, conductor 46 and terminal 15' of winding 15. During the period of conduction the charge on capacitor 37 will contribute considerably to the base current flow.

The secondary winding 121 of transformer 31 is connected across a diode 124 in series with a capacitor 130. The electrical pulses which are emitted by winding 121 when transistor 28 passes intermittently current through winding 30 are stored in capacitor 130. This voltage is added to the voltages existing between conductors 126 and 127 and triggers the neon light 122 into conduction. Current then flows from conductor 127 through resistor 132' normally closed push button 131', resistor 129 and resistor 125 to conductor 126 until push button 131 is operated interrupting the current flow causing the neon light to extinguish itself.

The conduction of transistor 95 through its emitter collector circuit actuates the switch or flip-flop circuit comprising transistors 106 and 107. Transistor 106 comprises a base 108, emitter 109 and a collector 110. Base 108 is connected at point 111 between resistor 104 and diode 105 in series circuit between conductors 103 and 35 in the emitter collector circuit of transistor 95. The flow of current through the latter circuit including the emitter and collector of transistor 94 applies a positive potential with reference to emitter 109 to base 108 of transistor 106 and renders it conductive. Current then flows from conductor 103 through conductor 113, collector 110, emitter 109 of transistor 106 and resistor 112 to conductor 35.

In the usual manner for flip-flop circuits of the type shown in the circuits for transistors 106 and 107 upon the flow of current through the emitter collector circuit of transistor 106 the base of transistor 107 is rendered negative with respect to its emitter 115 and current flows from conductor 103 (considered positive in polarity) through resistor 118, collector 116, emitter 115, conductor 117, resistor 112 to conductor 35 (considered negative in polarity). The discontinued flow of current through the emitter collector circuit of transistor 107 renders the base 120 of transistor 28 positive thereby rendering transistor 28 conductive. Transistor 28 then passes half wave AC current pulses from winding 17 through conductors 21, 22, diode 23, resistor 24, conductor 25, collector 26, emitter 27, conductor 29, primary winding 30 of transformer 31, diode 32 to the positive terminal 20 of the relay output signal terminals 20, 20'. The amplitude of the half wave signal passed by transistor 28 is limited by Zener diode 174.

In accordance with the operation of the relay system illustrated in FIG. 1, pulses either constant or variable are fed into transformer 12. Secondary windings 15, 16 and 17 responsive to those pulses energize their respective circuits. Pulses or parts thereof from secondary winding 15 above a given voltage value are fed to storage capacitor 37. Transistor 42 provides a switching function in the circuit utilized to charge capacitor 37 from secondary winding 15. Transistor 42 operating as a switching device becomes conductive upon the transmission by secondary winding 15 of pulses above a predetermined voltage rating. When pulses of a predetermined voltage rating are transmitted by secondary winding 15, Zener diode 49 in the shunting circuit 47 breaks down and conducts current. The conduction of current by shunting circuit 47 biases transistor 42 in the conductive direction. The bias potential applied to base 55 of transistor 42 is the resultant affect of three different and variable voltage values or signals as heretofore explained. Secondary winding 16 provides biasing, fully rectified pulses which in combination with the biasing affect of diode 43 limits the portions of or pulses passed by transistor 42 when rendered conductive. Transistor 42 when conductive passes discrete amounts of electric energy such as portions of parts or all of the pulses emitted by secondary winding 15 to storage capacitor 37.

Storage capacitor 37 upon reaching a predetermined charge triggers the sensing circuit comprising the interconnected transistors 94 and 95. Upon energization of transistors 94 and 95 the flip-flop circuit comprising transistors 106 and 107 is energized thereby rendering transistor 28 conductive. Upon the conduction of transistor 28 pulses are passed from secondary winding 17 through transistor 28 and the annunciation device comprising transformer 31 to the output terminals 20, 20'. The annunciation device is triggered upon the energization of transformer 31 to illuminate the neon lamp 122 or provide an audible sound by means of suitable devices.

The new static relays disclosed have an outstanding advantage over the present induction type relays insofar as the static relays incorporate features which render them capable of resetting practically instantaneously. Spurious relay operation has often been blamed in the past for unexpected shutdown of parts of a distribution network as a result of switching operations or short circuits in other parts of the network. Coordination of induction type relays is difficult to accomplish because of the inertia of the rotating discs and because of the relatively long time it takes for the discs to return to their reset positions. In other words, if an overload condition develops in one part of the system, more than one overcurrent relay disc usually starts to move in the direction for closing pairs of cooperating contacts. One of these relays usually will close its cooperating contacts first and the resulting redistribution of the electrical load on the system will cause another relay to operate prematurely because it already has traveled in the direction of contact closure under the influence of previous overcurrent conditions.

Since there are no moving parts in the new and improved static relays disclosed there is no inertia. This enables the new static relays to adjust themselves relatively instantaneously to prevailing load distribution. Their resetting speed can be controlled, if so desired.

Figure 2:
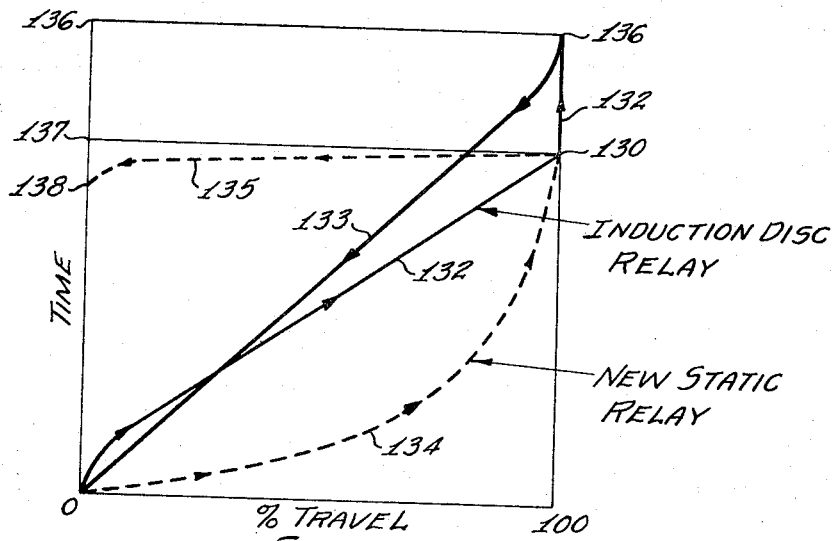
FIG. 2 illustrates graphically the operational differences between the prior art relays and the disclosed static relay embodying the invention.

FIG. 2 illustrates a graph of this important operational difference between the old and the new claimed relay structures and systems. Relay "travel" on the abscissa of the graph has been plotted against time on the ordinate assuming a fixed overcurrent condition in the electric network controlled by the relays. Although the newly disclosed relays are static relays with no moving parts the abscissa of the curves shown in FIG. 2 is called "travel" with the rate and or amount of charge of, for example, capacitor 37 being compared or assimilated with the percent of travel of a prior of moving cooperating contacts in an induction relay structure. The disc of the induction type relay will reach point 130 which is the relay contact closure position or 100 percent of relay travel with a practically constant rate of speed and will return to the starting point 0 at a fixed resetting speed. The resetting speed can be appreciably lower than the previous setting or contact closing speed of the relay. In FIG. 2 curve 132 illustrates the setting or contact closing time of an induction relay, and curve 133 illustrates the resetting time of the contacts.

The operation of the new static relay disclosed and claimed is represented by the dotted curve 134 which shows the "travel" or charge of the capacitor occurring at a continually decreasing rate of speed until the operation point 130 is reached. The new static relay will reset at a fixed high speed which is practically independent of the relay setting time or charging time. In FIG. 2 curve 135 represents the resetting time of the static relay. The distance between point 136 and point 0 on the ordinate of the curve shown in FIG. 2 indicates the time required for the induction disc relay to reset while the distance shown between point 137 and 138 on the ordinate of this curve illustrates the short time during which the new static relay resets. It is obvious that the relatively short resetting time of the new static relay is a distinct advantage in all cases where shifting loads in an electric distribution system require close setting of the relays. FIG. 2 clearly illustrates by the portions of curves 132 and 133 above the horizontal reference line 130–137 that the induction relays overshoot while the new static relay functions without overshooting and will, therefore, instantly respond to a change in current in the distribution system.

Figure 3:
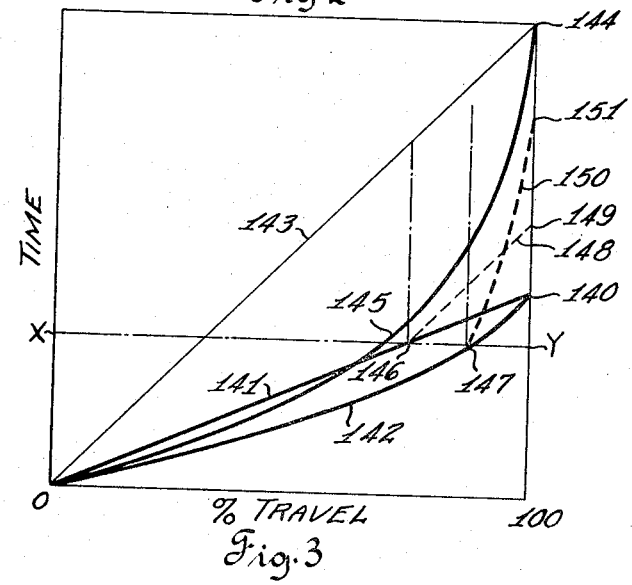
FIG. 3 illustrates graphically the comparison between the new static relay and a prior art induction disc relay under identical changing conditions.

FIG. 3 illustrates a comparison between the new static relay and the indunction disc type relay under changing overcurrent conditions. Assume, first that both relays are exposed to the same overcurrent condition. The induction disc relay and more particularly its controlling contacts will move with practically constant speed from the starting point 0 to point 140 along line 141 which is equivalent to 100 percent relay travel or contact operation. The static relay will charge in accordance with the nonlinear speed characteristics of curve 142 connecting the starting point 0 with point 140. Under constant current conditions both relays will operate at the same time.

If it is assumed that a current of a much lower value, but still high enough to produce relay operation and contact closure occurs, the induction relay during the same operating period will perform along a straight line 143 connecting point 0 with point 144 and under the same conditions the static relay will operate in accordance with the nonlinear characteristics illustrated by the curve 145 connecting the two points 0 and 144.

If it is assumed as a third operating condition that the induction disc relay and the static relay are exposed to identical overcurrent conditions affecting induction relay operation along the straight line 141 and the static relay operation along the nonlinear curve 142, respectively, at a given time the induction disc relay and the static relay will have arrived at point 146 and 147, respectively, on the horizontal line XY. If it is assumed that the current changes abruptly at this point of time to a much lower value the induction disc relay operates along the dotted line 148 illustrated between the points 146 and 149 and the static relay operates along the curve 150 illustrated between the points 147 and 151. It is apparent that the static relay's nonlinear characteristics provides additional time for performing its function equivalent to the ordinate shown between 149 and 151 under the assumed lower current operating conditions.

Further detailed analysis reveals the fact that the static relay continually monitors and relatively instantaneously recognizes an overcurrent condition which turns from bad to worse, by charging and closing a circuit associated therewith somewhat quicker than an induction disc type relay which performs under identical conditions and on the same inverse time current characteristics.

The static relay allows more time as compared to the induction type relay for closing its contacts if the overcurrent condition improves by decreasing in current value. It also performs without undesirable acceleration and deceleration characteristics and will reset practically instantaneously to its starting point if the overcurrent condition is relieved temporarily. The static relay because of its nonlinear travel time characteristics takes a longer time to operate on decreasing currents and somewhat shorter time to operate on increasing currents when compared with the induction disc relay under the same identical operating conditions. In addition, it is possible with the newly disclosed static relay to more easily coordinate its operation with other static relays and conventional relays because of the lack of enertia of its component parts than conventional relays can be coordinated with each other or the static relay.

FIG. 4 illustrates graphically the time energy characteristics of the build-up of the energy applied across the the capacitance storage device 37. The trigger level at which the zener diode 105 starts to conduct and transistor 106 is made conductive is illustrated by the horizontal line A–B. Each of the curves V, $V_1$, $V_1'$, and $V_1''$ represent a different voltage characteristic derived from the voltage pulses supplied by transformer 12 and particularly the secondary windings 15, 16 and 17 thereof.

Figure 6:
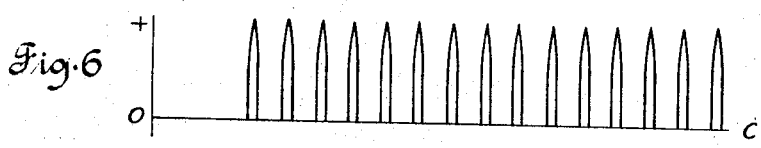
FIG. 6 illustrates graphically the transfer of energy by the static device from the source to the storage device when such transfer occurs in the form of pulses, and in accordance with the control signal characteristics as shown in FIG. 5.

FIG. 5 illustrates graphically the build-up of the voltage represented by curve $V_1''$ in FIG. 4 with reference to a zero potential control line OC. This is the voltage applied across the emitter and base of transistor 42. Before transistor 42 starts to pass current and charges capacitor 37, the control voltage is entirely below the reference line OC shown in FIG. 5. If the applied voltage exceeds a certain value represented by line OC the Zener diode 49 begins to conduct current and the resulting voltage drop across resistor 48 eventually overrides the negative bias provided by diode 43. As shown in FIG. 5 the control bias voltage now periodically assumes positive values and causes the the transistor to pass current as shown in FIG. 6.

If the voltage applied to the primary winding 14 of transformer 12 further rises the graphic illustration shown in FIG. 7 occurs. FIG. 7 illustrates the build-up of the voltage represented by curve $V_1'$ with reference to the zero potential line OC.

Figure 8:
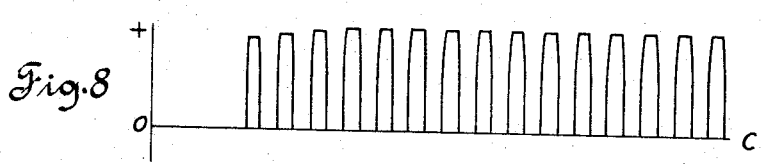
FIG. 8 illustrates graphically in the transfer of energy by the static device from the source to the storage device when such transfer occurs in the form of pulses, and in accordance with the control signal characteristics as shown in FIG. 7.

FIG. 8 illustrates graphically the current pulses passed by transistor 42 when the voltage pulses illustrated in FIG. 7 are applied across its base 55 and emitter 41.

FIG. 9 illustrates in the upper tracing 160 an oscillograph record of the condition wherein capacitor 37 is charged approximately in accordance with the voltage rise shown by curve $V_1''$ of FIG. 4. The lower trace 161 of FIG. 9 illustrates the current pulses passed by the switching transistor 42 representative of the charging condition shown in FIG. 6. Tracing 160 of FIG. 9 is a composite curve representing the direct current bias voltage from diode 43 and the alternating control voltage taken from winding 16 of pulsing transformer 12, and the voltage drop across resistor 48 provided by Zener diode 49.

FIG. 10 illustrates an oscillograph tracing 163 of the composite voltage applied across the base and emitter of transistor 42 under the raising voltage condition illustrated by the curve $V_1'$ of FIG. 4. The lower tracing 164 of FIG. 10 illustrates the current pulses passed by transistor 42 upon the application of the voltage pulses shown by tracing 163 thereto, as described. It is readily noted from FIG. 10 that the sharp points or peaks of the control voltage begins to break down or flatten out as compared to the voltage curve of FIG. 9 with a resulting widening of the corresponding current pulses. FIG. 7 graphically shows the increased positive control voltage peaks and FIG. 8 shows the resulting wider and higher current pulses.

FIG. 11 illustrates an oscillograph tracing 165 of the composite voltage applied across the base and emitter of transistor 42 under the raising voltage condition illustrated by the curve $V_1$ of FIG. 4. The lower tracing 166 of FIG. 11 illustrates the current pulses passed by transistor 42 upon the application of the voltage pulses shown by tracing 165 thereto. The sharp points or peaks of the control voltage have flattened out with the resulting widening of the corresponding current pulses.

FIG. 12 illustrates oscillograph tracings 167 and 168 which are similar to those shown in FIGS. 9, 10 and 11 but under the raising voltage condition illustrated by the curve V of FIG. 4. Tracing 168 shows almost a continuous current flow interrupted by small dips 169. The difference in the depth of the current interruptions is a result of the ripple voltage which appears across capacitor 51 because only each half cycle rectifier 45 passes current and charges capacitor 51. Therefore, on each alternate half cycle Zener diode 49 senses a higher or a lower voltage which is the cause for the variations in the current peaks shown in tracing 168. It is conceivable that capacitor 51 can be eliminated with an elimination of one alternate current pulse.

FIG. 13 illustrates graphically the build-up of the voltage represented by curve V in FIG. 4 and closely resembles the voltage pulses shown in oscillograph record in FIG. 12. As shown in FIG. 13 the control voltage between emitter and base of transistor 42 is driven completely into the positive region so that a continuous current flow results. This is an idealized condition. In reality the current flow might not be continuous but will show slight periodic half wave dips because of the effect of the half wave rectifier 45 previously discussed.

FIGS. 14, 15 and 16 illustrate oscillograph tracings similar to those shown in FIGS. 9 through 12 wherein the alternating control voltage taken from secondary winding 16 of transformer 12 is reversed in polarity with reference to the direct current bias taken from resistor 48. When this alternating ripple voltage is reversed in polarity the result is that the relays have an extremely inverse time current characteristics. In other words, a slight increase of the current at the beginning of a charging cycle of the storage device will have a tremendous reduction in charging time while at higher current values and in particular at current values where the switching transistor conducts current continuously, no difference exists between the reversed connection and the shown connection.

FIG. 14 shows the inverted control voltage in the upper trace and the resulting rounded out broader current pulses in the lower trace. The oscillograph record illustrated in FIG. 15 shows a similar condition with greater voltage applied to the relay, and FIG. 16 is identical to FIG. 12 showing only small narrow current dips for an otherwise almost continuously charged capacitor 37.

FIGS. 17 and 18 illustrate the time-current charging condition of the circuit disclosed when winding 16 of transformer 12 is reversed under two different voltage conditions.

FIG. 19 illustrates a modification of the circuit shown in FIG. 1 wherein a source of direct current pulses representative of an independent source of intelligence is fed into the relay circuit to control its operation. The circuit 130 of the modification is fed a steady source of controlled pulses through conductors 11 to the primary winding 14 of the transformer 12. These steady state alternating current pulses tend to make circuit 170 function as does the circuit shown in FIG. 1. By applying a source of direct current pulses across resistor 48 we can now control the base potential of transistor 42 independently of the other relatively constant circuit conditions affecting this base potential. Thus, the modified relay functions in accordance with a direct current quantity. Relay circuit 170 shown in FIG. 2 comprises the same circuit components shown in FIG. 1 and operates in the same general manner except that Zener diode 49 and resistor 50 have been removed from the circuit and a variable direct current signal applied to terminals 171, 171'.

Although but a few embodiments of the present invention have been illustrated and described, it will be apparent to those skilled in the art tht various changes and modification may be made therein without departing from the spirit of invention or from the scope of the appended claims.

Having now particularly described and ascertained the nature of my said invention and the manner in which it is to be performed, I declare that what I claim is:

1. An electric circuit comprising a source of electric pulses, an electric pulse storage device, a transistor switching means for connecting said source of pulses to said storage device, an interruptable shunting means connected across said storage device, and means for triggering said switching means into conduction and interrupting said shunting means comprising a sensing device connected across said source of pulses for passing current only upon said pulses exceeding a predetermined voltage, said sensing device upon conduction triggering said switching means to connect said source of pulses to said storage device and interrupt said shunting means across said storage device causing said storage device to assume an electrical charge, said storage device being charged at a rate depending on the volt second characteristics of said pulses passed by said sensing device.

2. An electric circuit comprising a source of electric pulses, an electric pulse storage device, a transistor switching means for intermittently connecting said source of pulses to said storage device, a shunting transistor for intermittently shunting said storage device, and means for triggering said switching means into conduction comprising a sensing circuit connected across said source of pulses for passing current only upon said pulses exceeding a first predetermined voltage, said sensing circuit upon conduction triggering said switching means to connect said source of pulses to said storage device, and means responsive to said pulses exceeding a second predetermined voltage for triggering said shunting transistor to interrupt the shunt across said storage device causing said storage device to assume an electrical charge, said storage device being charged at a rate depending on the volt second characteristics of said pulses passed by said sensing circuit.

3. An electric circuit comprising a source of electric pulses, an electric pulse storage device, a transistor switching means for connecting said source of pulses to said storage device, a shunting transistor for shunting said storage device, and means for triggering said switching means into conduction comprising a sensing circuit, said sensing circuit being energized upon said pulses exceeding a first predetermined voltage, said sensing circuit upon energization triggering said switching means into conduction to connect said source of pulses to said storage device, and means responsive to said pulses exceeding a second predetermined voltage for rendering the shunting effect of said shunting transistor ineffective causing said storage device to assume an electrical charge, said storage device being charged at a rate depending on the volt second characteristics of said pulses passed by said sensing circuit.

4. An electric circuit comprising a source of electric pulses, an eletcric pulse storage device, a transistor switching means for connecting said source of pulses to said storage device, a shunting transistor for shunting said storage device, and means for triggering said switching means into conduction comprising a first sensing circuit, said sensing circuit being energized upon said pulses exceeding a first predetermined voltage, said first sensing circuit upon energization triggering said switching means into conduction to connect said source of pulses to said storage device, and a second sensing circuit responsive to said pulses exceeding a second predetermined voltage for rendering the shunting effect of said shunting transistor ineffective causing said storage device to assume an electrical charge, said storage device being charged at a rate depending on the volt second characteristics of said pulses passed by said first sensing circuit, said shunting transistor upon deenergization of said second sensing circuit being rendered conductive to shunt and discharge said storage circuit.

5. An electric circuit comprising a source of electric pulses, an electric pulse storage device, a transistor switching means for intermittently connecting said source of pulses to said storage device, said switching means being biased into nonconduction, a shunting transistor for intermittently shuting said storage device, said shunting transistor being biased into conduction, and means for triggering said switching means into conduction comprising a sensing circuit connected across said source of pulses for passing current only upon said pulses exceeding a first predetermined voltage, said sensing circuit upon conduction triggering said switching means to conduction to connect said source of pulses to said storage device, and means responsive to said pulses exceeding a second predetermined voltage for triggering said shunting transistor for rendering it nonconductive to interrupt its shunting function across said storage device causing said storage device to assume an electrical charge, said storage device being charged at a rate depending on the volt second characteristics of said pulses passed by said sensing circuit.

6. An electric circuit comprising a source of electric pulses, an electric pulse storage device, a transistor switching means for intermittently connecting said source of pulses to said storage device, means for electrically biasing said switching means into nonconduction, a shunting transistor for intermittently shunting said storage device, means for electrically biasing said shunting transistor into conduction for discharging said storage device, and means for triggering said switching means into conduction comprising a sensing circuit connected across said source of pulses for passing current only upon said pulses exceeding a first predetermined voltage, said sensing circuit upon conduction electrically biasing said switching means into conduction to connect said source of pulses to said storage device, and sensing means responsive to said pulses exceeding a second predetermined voltage for electrically biasing said shunting transistor for rendering it nonconductive to interrupt its shunting function across said storage device causing said storage device to assume an electrical charge, said storage device being charged at a rate depending on the volt second characteristics of said pulses passed by said sensing circuit, said shunting transistor upon denergization of said sensing means being rendered conductive by said biasing means to substantially immediately shunt and discharge said storage device.

7. An electric circuit comprising a source of electric pulses, a storage device comprising a capacitor, a transistor switching means for connecting said source of pulses to said capacitor, means for electrically biasing said switching means into nonconduction, a shunting transistor for shunting said capacitor, means for electrically biasing said shunting transistor into conduction for discharging said capacitor, and means for triggering said switching means into conduction comprising a sensing circuit connected across said source of pulses for passing current only upon said pulses exceeding a first predetermined voltage, said sensing circuit upon conduction electrically biasing said switching means to conduction to connect said source of pulses to said capacitor, sensing means responsive to said pulses exceeding a second predetermined voltage for electrically biasing said shunting transistor for rendering it nonconductive to interrupt its shunting function across said capacitor causing said capacitor to assume an electrical charge, said capacitor being charged at a rate depending on the volt second characteristics of said pulses passed by said sensing circuit, said shunting transistor upon denergization of said sensing means being rendered conductive by said shunting transistor biasing means to substantially immediately shunt and discharge said capacitor.

8. An electric circuit comprising a source of electric pulses, an accumulator for electric pulses, first switching means for connecting said source of pulses to said accumlator, first sensing means responsive to said source of pulses for triggering said first switching means to pass to said accumulator only pulses exceeding a predetermined voltage, said accumulator being charged at a rate depending on the volt second characteristics of said pulses, second switching means, and second sensing means connected to said accumulator for actuating said second switching means upon a predetermined condition of said accumulator.

9. An electric circuit comprising a source of electric pulses, an accumulator for electric pulses, first switching means for connecting said source of pulses to said accumulator, first sensing means responsive to said source of pulses for triggering said switching means to pass to said accumulator only pulses exceeding a predetermined voltage, said accumulator being charged at a rate depending on the volt second characteristics of said pulses, second switching means, a second sensing device connected to said accumulator for actuating said second switching means upon a predetermined electrical condition of said accumulator, and means for intermittently shunting said accumulator to remove the electric charge therefrom.

10. An electric circuit comprising a source of electric pulses, an electric pulse storage device, first switching means for connecting said source of pulses to said storage device, a first sensing device responsive to said source of pulses for actuating said first switching means to pass to said storage device only pulses exceeding a predetermined voltage, said storage device being charged at a rate depending on the volt second characteristics of said pulses passed by said first sensing device, second switching means, a second sensing device connected to said storage device, and a static switch controlled by said second sensing device for actuating said second switching means upon a predetermined condition of said storage device.

11. An electric circuit comprising a source of electric pulses, an electric pulse storage device, first switching means for connecting said source of pulses to said storage device, a first sensing device coupled to said source of pulses for actuating said first switching means to pass to said storage device only pulses exceeding a predetermined voltage, said storage device being charged at a rate depending on the volt second characteristics of said pulses, second switching means, a second sensing device connected to said storage device, and a static flip-flop circuit controlled by said second sensing device for actuating said second switching means upon a predetermined condition of said storage device.

12. An electric circuit comprising a source of electric pulses, an electric pulse storage device, a transistor for intermittently connecting said source of pulses to said storage device, said transistor being rendered nonconductive, means for imposing on said transistor a first signal to electrically bias said transistor toward conduction, and means for superimposing on said transistor a second signal, said transistor upon receiving said second signal passing pulses to said storage device, said storage device being charged at a rate depending on the volt second characteristics of said pulses passed by said transistor, a switching means, a sensing device connected to said storage device, and a static flip-flop circuit controlled by said sensing circuit for actuating said switching means upon a predetermined condition of said storage device.

13. An electric circuit comprising a source of electric pulses, a transformer comprising a primary winding, a first secondary winding and a second secondary winding, said primary winding being connected across said source of pulses, an electric pulse storage device, a semiconductor switch, means for connecting said switch to said first winding and to said pulse storage device, means for rendering said switch nonconductive, means for imposing on said switch a signal from said first winding for electrically biasing said switch to conduction, said switch upon receiving said signal passing pulses from said first winding to said storage device, said storage device being charged at a rate depending on the volt second characteristics of said pulses passed by said switch, a switching means for connecting a load to said second winding, a sensing device connected to said storage device, and a flip-flop circuit controlled by said sensing circuit for actuating said switching means to connect said second winding to said load upon a predetermined condition of said storage device.

14. An electric circuit comprising a source of electric pulses, a pulsing transformer comprising a primary winding, a first secondary winding, a second secondary winding and a third secondary winding, said primary winding being connected across said source of pulses, an electric pulse storage device, a transistor switch, means for connecting said switch to said first winding and to said pulse storage device, means for rendering said switch nonconductive, means for imposing on said switch a signal from said second winding for electrically biasing said switch toward conduction, means for imposing upon said switch a variable signal for electrically biasing said switch to conduction, said switch upon receiving said variable signal passing pulses from said first winding to said storage device, said storage device being charged at a rate depending on the volt second characteristics of said pulses passed by said switch, a switching means for connecting a load to said third winding, a sensing device connected to said storage device, and a flip-flop circuit controlled by said sensing circuit for actuating said switching means to connect said third winding to said load upon a predetermined condition of said storage device.

15. An electric circuit comprising a source of electric pulses, a pulsing transformer comprising a primary winding, a first secondary winding and a second secondary winding, said primary winding being connected across said source of pulses, an electric pulse storage device, a transistor switch, means for connecting said switch to said first winding and to said pulse storage device, means for rendering said switch nonconductive, means for imposing on said switch a signal from said first winding to electrically bias said switch to conduction, said means comprising a first sensing circuit connected across said source of pulses for passing current only upon said pulses exceeding a predetermined voltage, said first sensing circuit upon conduction electrically biasing said switch to conduction causing said switch to pass pulses to said storage device, said storage device being charged at a rate depending on the volt second characteristics of said pulses passed by said switch, a switching means for connecting a load to said second winding, a second sensing device connected to said storage device, and a flip-flop circuit controlled by said second sensing circuit for actuating said switching means to connect said second winding to said load upon a predetermined condition of said storage device.

16. An electric circuit comprising a source of electric pulses, a pulsing transformer comprising a primary winding, a first secondary winding and a second sceondary winding, said primary winding being connected across said source of pulses, an electric pulse storage device, a transistor switch, means for connecting said switch to said first winding and to said pulse storage device, means for rendering said switch nonconductive, means for imposing on said switch a DC signal from a variable source for electrically biasing said switch, said switch upon receiving said DC signal passing pulses from said first winding to said storage device, said storage device being charged at a rate depending on the volt second characteristics of said pulses passed by said switch, a switching means for connecting a load to said second winding, a sensing device connected to said storage device, and a flip-flop circuit controlled by said sensing circuit for actuating said switching means to connect said second winding to said load upon a predetermined condition of said storage device.

17. An electric circuit comprising a source of electric pulses, a pulsing transformer comprising a primary winding, a first secondary winding, a second secondary winding and a third secondary winding, said primary winding being connected across said source of pulses, an electric pulse storage device, a transistor switch, means for connecting said switch to said first winding and to said pulse storage device, means for rendering said switch nonconductive, means for imposing on said transistor a first signal from said second winding to electrically bias said transistor switch toward conduction, means for imposing upon said switch a second DC signal for rendering said switch conductive, said switch upon receiving said second DC signal passing pulses from said first winding to said storage device, said storage device being charged at a rate depending on the volt second characteristics of said pulses passed by said switch, a switching means for connecting a load to said third winding, a sensing device connected to said storage device, and a flip-flop circuit controlled by said sensing circuit for actuating said switching means to connect said third winding to said load upon a predetermined condition of said storage device.

18. An electric circuit comprising a source of electric pulses, a pulsing transformer comprising a primary winding, a first secondary winding and a second secondary winding, said primary winding being connected across said source of pulses, an electric pulse storage device, a transistor switch, means for connecting said switch to said first winding and to said pulse storage device, means for rendering said switch nonconductive, means for imposing on said switch a signal from said first winding to electrically bias said switch to conduction, said means comprising a first sensing circuit connected across said source of pulses for passing current only upon said pulses exceeding a predetermined voltage, said first sensing circuit upon conduction electrically biasing said switch to conduction causing said switch to pass pulses to said storage device, said storage device being charged at a rate depending on the volt second characteristics of said pulses passed by said switch, a switching means for connecting a load to said second winding, a second sensing device connected to said storage device, a flip-flop circuit controlled by said second sensing circuit for actuating said switching means to connect said second winding to said load upon a predetermined condition of said storage device and an indicating device connected across said load and energized upon connection of said second winding to said load.

19. An electric circuit responsive to the time related current level of an alternating current electrical power system, said circuit comprising:
- a transformer coupled to the power system for producing an output varying in response to the current of the power system;
- means for rectifying the output to produce unidirectional pulses;
- a series connected resistance-capacitance circuit connected to have the capacitance charged by the unidirectional pulses;
- a transistor switching circuit connected between the means for rectifying and the resistance-capacitance circuit, said switching circuit responsive to the level of the pulses for connecting the resistance-capacitance circuit to receive only that portion of the pulses exceeding a predetermined level; and
- means responsive to the charge of the capacitance for producing a signal when said charge reaches a predetermined voltage.

20. An electric circuit for receiving electric pulses from a source thereof varying as a function of the current of an electrical source to produce a signal at a predetermined time related current level of the source, said circuit comprising:
- an electrical energy storage device;
- a semiconductor switching circuit for connecting the source of pulses to the storage device;

sensing means connected to receive the pulses for conducting current only when the pulses exceed a predetermined instantaneous level, said sensing means during conduction connected to turn on the semiconductor switching circuit to connect the source of pulses to the storage device; and means responsive to the level of energy stored by the storage device for producing the signal when said stored energy reaches a predetermined level.

21. A static inverse time current relay comprising:
means responsive to current in an electrical power system for producing pulses varying as an instantaneous function of the current level of the electrical system;
an electric energy storage device;
a semiconductor switching circuit for connecting the means for producing pulses to the storage device;
a semiconductor shunting circuit connected across the storage device;
sensing means connected to receive the pulses for conducting current only when the pulses are exceeding a predetermined instantaneous level, said sensing means during conduction turning on the semiconductor switching circuit to connect the means for producing pulses to the storage device;
means responsive to the pulses for controlling the semiconductor shunting circuit to interrupt the shunting circuit when the average level of the pulses is greater than a predetermined level to enable the storage device to be charged by the pulses; and
means responsive to the stored energy level for producing the signal when said stored energy reaches a predetermined level.

22. An electric circuit responsive to the time related current level of an alternating current electrical power system, said circuit comprising:
a transformer coupled to the power system for producing a first output and a second output both varying in response to the current in the power system;
means for rectifying the first output to produce unidirectional pulses;
means for rectifying and filtering the second output to produce a relativley continous output;
a resistance-capacitance circuit connected to have the capacitance charged by the unidirectional pulses;
a semiconductor switching circuit connected between the resistance-capacitance circuit and the means for rectifying the first output, said switching circuit connected to be responsive to the level of the pulses for connecting the resistance-capacitance circuit to receive only that portion of the pulses exceeding a predetermined level;
a semiconductor shunting means connected across the capacitance and connected to be responsive to the continuous output for totally discharging the capacitance when said continuous output is less than a predetermined level; and
a circuit responsive to the charge of the capacitance for producing a signal when said charge reaches a predetermined voltage.

23. An electric circuit responsive to the time related current level of an alternating current electrical power system, said circuit comprising:
a transformer coupled to the power system for producing a first output and a second output each proportional to the instantaneous current of the power system;
means for rectifying the first output to produce unidirectional pulses;
a resistance-capacitance circuit connected to have the capacitance charged by the pulses;
a semiconductor switching circuit connected between the means for rectifying the first output and the resistance-capacitance circuit, said switching circuit responsive to the level of the pulses for connecting the resistance-capacitance circuit to receive only that portion of the pulses exceeding a predetermined level;
a semiconductor shunting circuit connected across the capacitance to short out the capacitance when turned on;
means for rectifying and filtering the second output;
means responsive to the rectified and filtered second output for controlling said semiconductor shunting circuit to turn off said semiconductor shunting circuit when said second output is greater than a predetermined level and to turn on said semiconductor shunting circuit when said second output is less than a predetermined level; and
a circuit responsive to the charge of the capacitance for producing a signal when said charge reaches a predetermined voltage.

References Cited

UNITED STATES PATENTS

| | | | |
|---|---|---|---|
| 2,567,247 | 9/1951 | Spalding | 328—68 |
| 2,832,900 | 4/1958 | Ford | 307—88.5 |
| 2,834,883 | 5/1958 | Lukoff | 328—151 |
| 2,840,707 | 6/1958 | Johnson | 328—151 |
| 2,879,456 | 3/1959 | Pinckaers | 307—88.5 |
| 2,909,720 | 10/1959 | Fthenakis | 307—88.5 |
| 2,911,545 | 11/1959 | Pinckaers | 307—88.5 |
| 2,935,572 | 5/1960 | Hastings et al. | 307—88.5 |
| 2,945,174 | 7/1960 | Hetzler | 307—88.5 |
| 2,956,118 | 10/1960 | Goodrich | 307—88.5 |
| 2,978,615 | 4/1961 | Chater | 307—88.5 |
| 3,015,042 | 12/1961 | Pinckaers | 307—88.5 |
| 3,049,631 | 8/1962 | Taylor | 307—88.5 |
| 2,866,106 | 12/1958 | Schuh | 307—88.5 |
| 2,875,382 | 2/1959 | Sandin et al. | 317—36 |
| 2,924,724 | 2/1960 | Booker | 307—88.5 |
| 2,942,123 | 6/1960 | Schuh | 307—293 |
| 2,977,510 | 3/1961 | Adamson et al. | 317—36 |
| 3,001,100 | 9/1961 | Schuh et al. | 307—88.5 |

JOHN W. HUCKERT, *Primary Examiner.*

J. D. CRAIG, *Assistant Examiner.*

U.S. Cl. X.R.

307—296, 246; 317—36; 328—151

UNITED STATES PATENT OFFICE
CERTIFICATE OF CORRECTION

Patent No. 3,421,028　　　　　　　　　　　　　　　　　　　　January 7, 1969

John Baude

It is certified that error appears in the above identified patent and that said Letters Patent are hereby corrected as shown below:

Column 12, line 55, "eletcric" should read -- electric --; line 73, "circui should read -- device --. Column 13, line 4, "shuting" should read -- shunting --; line 41, "denergization" should read -- deenergization --; line 66, "denergization" should read -- deenergization --. Column 17, line 43, "relativley" should read -- relatively --.

Signed and sealed this 24th day of March 1970.

(SEAL)
Attest:

Edward M. Fletcher, Jr.　　　　　　　　　　　　WILLIAM E. SCHUYLER, JR.
Attesting Officer　　　　　　　　　　　　　　　　　Commissioner of Patents